Sept. 2, 1969  R. B. HORSFALL ET AL  3,465,323
FLUID ALIGNMENT BEARING FOR SUPPORT MEMBERS
Filed Jan. 23, 1967
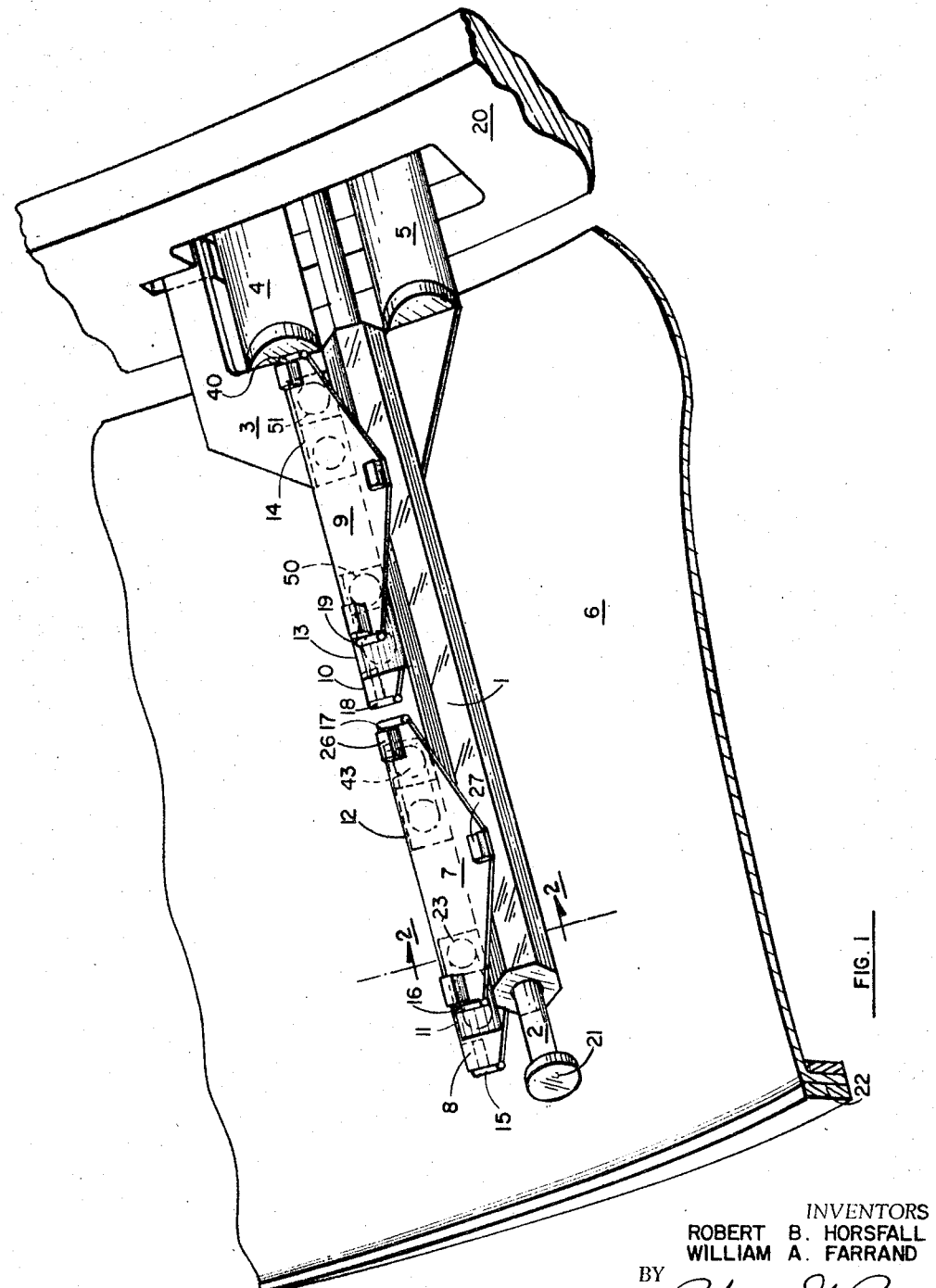
FIG. 1
*INVENTORS*
ROBERT B. HORSFALL
WILLIAM A. FARRAND
BY
ATTORNEY Sept. 2, 1969     R. B. HORSFALL ET AL     3,465,323

FLUID ALIGNMENT BEARING FOR SUPPORT MEMBERS

Filed Jan. 23, 1967     2 Sheets-Sheet 2

INVENTORS
ROBERT B. HORSFALL
WILLIAM A. FARRAND
BY
*Robert D. Rogers*
ATTORNEY 3,465,323
FLUID ALIGNMENT BEARING FOR SUPPORT MEMBERS
Robert B. Horsfall, Placentia, and William A. Farrand, Fullerton, Calif., assignors to North American Rockwell Corporation, a corporation of Delaware
Filed Jan. 23, 1967, Ser. No. 611,159
Int. Cl. G11b 5/00
U.S. Cl. 340—174.1                  2 Claims

ABSTRACT OF THE DISCLOSURE

A hydrostatic fluid alignment bearing arrangement for a transducer support comprising at least one piston member connected to the support and disposed inside a cylinder. The piston has an outer circumference which increases toward the device support member for decreasing the space between the cylinder surface and the piston surface in the direction of fluid flow whereby a fluid bearing is formed to permit the support member to be self-aligning with respect to a reference surface. Fluid pressure in the cylinder also forces the support toward the reference surface.

BACKGROUND OF THE INVENTION

Field of the invention

The invention relates to a fluid bearing combination which permits self-alignment of a transducer support member or other device with respect to a reference surface.

Description of prior art

The closest similar art is found in the field of digital magnetic recording devices such as disk files. In general such devices preferably make use of a hydrodynamic or hydrostatic bearing between a transducer support carrying the magnetic recording-reproducing heads and the moving magnetic retentive surface. Various means, such as mechanical springs, are used to interconnect the transducer support member with other parts of a disk file system. One specific example of related art is described in an article beginning on page 341 of the Proceedings of the 1963 Fall Joint Computer Conference, published by Spartan Books, Inc., Baltimore, Md. As described in the reference, the transducer support member is mechanically connected to an arm member by means of a flat flexible spring, and is forced toward a recording surface by pneumatic pressure exerted by a piston which is mechanically pivoted relative to the support member.

In general, all present art transducer support members are connected to arm member, or equivalent structure, through devices which involve frictional contacts of one form or another and which, therefore, have the two-fold disadvantage of frictional resistance and of the generation of wear fragments. Both disadvantages can interfere with the hydrodynamic bearing and recording functions. In some designs it is possible, or necessary, for the transducer supports to be in contact with the recording surface before that surface begins to move. The condition is undesirable because of the possibility of frictional damage to the recording surface or the transducer heads. Therefore, preferred embodiments should include means for withdrawing the transducer supports from the recording surface during inoperative conditions. For example, the supports could be withdrawn by means of a spring, together with separate means for providing the force necessary to hold the recording gap at a desired value during operation.

Furthermore, it is extremely difficult to provide sufficient precision in manufacture to assure proper operation of the heads unless the transducer support is capable of following minor movements of the recording surface at right angles to its plane. For this purpose a small amount of angular freedom of the transducer support about axes parallel to the recording surface is desirable.

SUMMARY OF THE INVENTION

Briefly, the invention comprises a fluid bearing configuration for locating a transducer support member or similar device with respect to a reference surface, such as a recording disk. The configuration comprises at least one piston member which inserts into a cylindrical sleeve member to form an integral restrictor bearing for permitting self-alignment of the support. This bearing provides the support with two degrees of freedom about axes parallel to the surface and one degree of translational freedom orthogonal to that surface.

Although bearings utilizing various fluids are within the scope of this invention, for purposes of this description a gas, such as air, is used as the bearing fluid.

Furthermore, although the detailed description relates to configurations in which piston means are connected to support means and cylinder means are connected to the support arm, it should be understood that an inverse arrangement is equally within the scope of the invention. That is, an arrangement where a cylinder-like member is connected to the supported members and the piston is connected to the support arm. In certain applications, the inverse arrangement may be preferred as, for example, if the support member must be a replaceable unit.

In a preferred embodiment a spring member may be connected to the support member to withdraw the support from the facing surface when the gas bearing is not actuated. In that manner direct contact of the support member and the reference surface is avoided until the device attains sufficient speed for hydrodynamic lubrication between the support and the facing surface. When gas is then supplied to the cylinder, the pressure on the piston forces the support member toward the surface, overcoming the spring tension and providing a load to maintain the desired hydrodynamic bearing film thickness. Simultaneously, the integral restrictor bearing prevents mechanical contact and resultant abrasion between the piston and cylinder surfaces.

In order to provide integral restrictor bearing performance, the outer circumferential surface of the piston and the inner circumferential surface of a cylinder form a gap whose width decreases in the direction of gas flow. Gas escaping from the cylinder by flowing through this tapering gap varies in pressure in such a way as to tend to center the piston within the cylinder. For example, if the piston tends to move toward one side of the cylinder, the gas flow on that side is more restricted than one the opposite side and, as a result, a higher average pressure exists within this portion of the gap. The difference in pressure on the two sides, therefore, tends to force the piston back toward the center of the cylinder. In the preferred embodiment, the spring member produces a relatively light force so that the force due to the gas pressure on the piston is the major force counteracting the hydrodynamic pressures generated beneath the support member. Therefore, the force balance is between a substantially constant piston force and a hydrodynamic bearing force which varies extremely rapidly with gap so that the support can follow variations in moving surface position with high fidelity.

In different embodiments, the variation in bearing gap may result from a continuously varying curved piston profile or by stepwise variation in said profile. The choice of configuration may be based on consideration of the compromise between centering force requirements and angular freedom requirements.

Normally, it is desired to prevent angular rotation of the support member about an axis orthogonal to the facing surface. To provide this constraint, at least two separated bearings may be provided for each support member. However, a separate mechanism may also be used.

In one embodiment the cylinders are double-ended and have pistons at each end connected to separate support members which cooperate with a pair of parallel (recording) surfaces on opposite sides of the transducer support arm.

Therefore, it is an object of this invention to provide a hydrostatic fluid bearing supported piston for positioning a support member for transducers or the like.

Another object of this invention is to provide an integral restrictor bearing supported piston for positioning a support member for transducers.

A still further object of this invention is to provide an integral restrictor bearing and means for holding a support away from a reference surface when the bearing is not actuated.

It is still further object of this invention to provide dual integral restrictor gas bearings for supporting parallel disposed transducer supports to permit alignment of the supports with respect to parallel disposed recording surfaces.

These and other objects of this invention will become more apparent in connection with the following drawings.

BRIEF DESCRIPTION OF THE DRAWINGS

FIGURE 1 is an illustration of transducer supports connected to a positioning arm and using an integral restrictor gas bearing for alignment.

DESCRIPTION OF THE PREFERRED EMBODIMENTS

Referring now to FIGURE 1, wherein positioning arm 1 is shown enclosing shaft 2. The arm may be supported on the shaft by means of a fluid bearing such as described in patent application Ser. No. 607,466, filed Jan. 5, 1967, by William A. Farrand et al. for a Transducer Positioning Member Having Hydrostatic Bearing Supports. As described in the application, the shaft includes a channel which is connected to an air source. Air flows into the space between the shaft and arm from which it escapes through separated gas bearings.

Plate 3 is rigidly connected to the arm and provides a surface which can be constrained to prevent rotational motion of the arm about the shaft. Motors 4 and 5 are connected to the arm for driving the arm radially with respect to disc 6. In other embodiments, the arm may be stationary so that the requirement for a positioning motor, a bearing supported arm, and rotational constraints may not be necessary.

Figure 2:
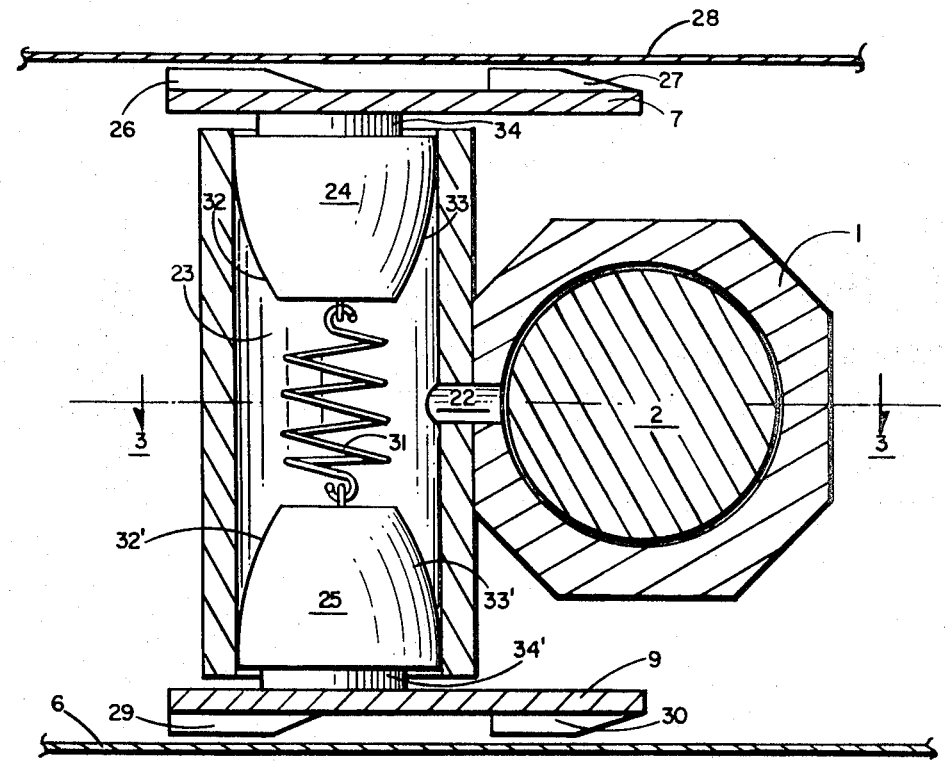
FIGURE 2 is a cross-sectional view of the FIGURE 1 embodiment showing the bearing configuration and one embodiment of a withdrawal member.

Transducer supports 7, 8, 9 and 10 are connected to the arm by the gas bearings which are more clearly illustrated in FIGURE 2. The bearings are formed by an opening within the housing members 11, 12, 13 and 14 in conjunction with piston-like members connected to the supports. The housing member includes centrally located cylindrical openings 23, 43, 50 and 51 more clearly shown in FIGURE 2. Transducers 15, 16, 17, 18, 19 and 40 are shown connected to the supports. Other transducers are also connected to the supports but are not visible in the FIGURE 1 illustration.

The supports illustrated are provided with a plurality of interconnected pads for generating a gas bearing between the supports and the disc surface as described in patent application Ser. No. 606,204, filed Dec. 30, 1966, by Robert B. Horsfall et al. for Fluid Bearing Pads for Supporting Transducers. Other bearing supports are also usable with the present invention and the illustration is given by way of example and is not intended to be a limitation on the types of bearings or the means by which the supports are maintained at a gap with respect to the disc surface.

The shaft is indirectly secured to a fixed portion of the system connected to the central housing portion 20. The shaft is provided with mechanical stop 21 to prevent the arm from being directed to an extreme radial position.

The particular disc as in the present description is an annularly tensioned disc held in tension by hoop means 22 at the circumference of the disc. Although the annular tensioned disc is illustrated and used in the example, it should be understood that the invention can be used with other types of discs and other surfaces such as drums, tapes, and the like.

Although the primary application of this invention relates to the positioning of magnetic transducers relative to a magnetic recording disk, other applications are in principle within the scope of the invention. For example, in certain applications of diamond saws for cutting refractory materials, it may be desirable to provide a very thin blade with aligning and damping support immediately adjacent to the point where the saw enters the cut. By using the coolant fluid as a bearing fluid and controlling the rate of admission of the fluid to the cylinders by a servo operated valve, it would be possible to use a support member constrained by a piston/cylinder device in accordance with this invention on either side of the blade to control its location.

Similarly, in machine control, it may be desirable to use the principles of this invention to control the location of a gauging head relative to a scale, where the rate of relative motion is low enough to require use of a hydrostatic bearing (or direct contact) between head and scale.

Referring now to FIGURE 2, wherein a cross-sectional view of the integral restrictor gas bearing associated with supports 7 and 9 is more clearly illustrated. As shown in FIGURE 2, channel 22 connects cylinder 23 to the source of gas used in developing a bearing for arm 1. Piston member 24 is connected to support 7 and piston member 25 is connected to support 9. Pads 26, 27 comprise raised surfaces for developing a gas bearing between support 7 and the disc surface 28 above it. Pads 29 and 30 are connected to transducer support 9 for developing a gas bearing between support 9 and the surface of disc 6. A third pad for each support is not visible. Spring member 31 is connected between the two pistons. Before air is admitted into the chamber, the spring provides a force for withdrawing the supports from the recording surfaces.

Although the particular embodiment illustrates a spring connected inside the cylinder to both pistons, in other embodiments the withdrawing force may be provided by other means. For example, a spring could be connected between transducer supports as shown in FIGURE 1, so that an individual spring for each cylinder would not be necessary. In other embodiments, a single spring may be connected between the arm and each transducer support or within the cylinder to each piston so that the pistons and the supports could operate independently of each other. Designs are possible in which spring members serve also for electrical interconnection.

As shown in cross-sectional view, each piston is a portion of a spindle-shaped body having a relatively large radius of curvature. Curved portions 32 and 33 show the external surface of piston 24 as having a radius of curvature in the plane of the figure which may be as much as 10 to 40 times the radius of the cylinder. Portions 32' and 33' show a similar curvature for the other piston. The exact radius of curvature must be determined so that in a particular embodiment the desired bearing force is generated. Also, the curvature must be adequate to permit rotational movement of the support about axes parallel to the plane of the recording disc so that the desired alignment between the transducers and the disc surface can be maintained. If the radius of curvature of the longitudinal section of the piston surface was twice that of the radius of the cylinder, there would be essentially no angular restriction of the rotation of the transducer support with respect to the surface. However, if the radius of curvature is relatively short, as would be the case with the ratio of 2 to 1, the bearing forces may be inadequate to provide adequate centering action. As a result, a longer radius must be used and the angular freedom reduced in proportion to the increased radius length. In a typical example, the curved piston portion would have a length and a radius of curvature so that when the bearing is centered, the small gap between the pistons and the cylinder is one-fifth as large as the gap at the other end of the piston between the piston and the cylinder.

The curved portions of pistons 24 and 25 are connected to transducer supports 7 and 9 by relatively short members 34 and 34' which have a radius somewhat less than the radius of the piston. The interconnecting members should have a height so that when the piston is withdrawn or pulled inside the cylinder, the transducer support is clear of the disc surface. In addition, the space provided by the member permits rotational alignment of the support with respect to the disc surface. If the supports were connected directly to the curved piston, the support surface adjacent to the cylinder termination would prevent alignment. Ordinarily, the member should be of a height at least as great as any potential displacement of the disc surface from its nominal position resulting from shock, vibration or the like during non-operating conditions.

Figure 3:
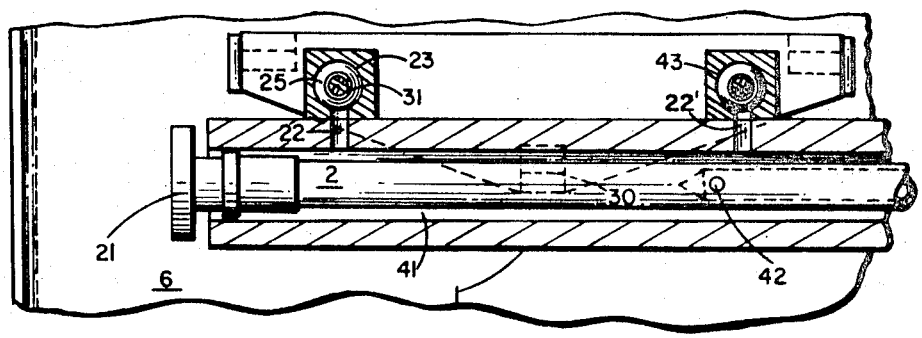
FIGURE 3 is a sectional view of the FIGURE 2 embodiment.

FIGURE 3 shows a sectional view of the FIGURE 1 embodiment, taken at a right angle with respect to FIGURE 2. The section more clearly shows channels 22 and 22' leading to chamber 41 formed between shaft 2 and arm 1. Gas is admitted into the chamber from orifice 42 which is connected to a gas source.

Gas from the chamber is forced through channels 22 and 22' into cylinders 23 and 43.

Although the present configuration shows the arm supported on the shaft by gas bearings, in other embodiments the arm can be supported by other means. Gas could be directed to the cylinder directly from a source, although for the embodiment shown, it is more practical to take the gas from the chamber.

Figure 4:
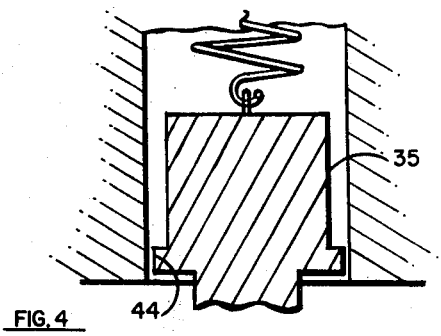
FIGURE 4 is a second cross-sectional view showing a second embodiment of an integral restrictor gas bearing usable with the FIGURE 1 embodiment.

Referring now to FIGURE 4 in which another embodiment is shown wherein the pistons have a cross-section comprising a narrow land 44 with very small radial clearance from the cylinder and a wider section 35 having a somewhat wider but still narrow gap between the piston surface and the cylinder surface. The ratio of the two gaps may be 2 to 1, for example. In all other respects the embodiment is essentially the same as that of FIGURE 2. A further embodiment not illustrated would comprise continuing the step-wise reduction indicated in FIGURE 4 to a plurality of steps in the nature of a segmental approximation to the continuous curve illustrated in FIGURE 2.

The piston portion, as well as the other portions of the embodiments illustrated, may be comprised of an anodized aluminum or other metals which have dimensional stability and which are corrosive resistant and light weight. For example, beryllium oxide or sintered beryllium can also be used. The pistons, cylinder housing units, and other portions of the illustrated embodiments could be formed by casting, molding, etching, drilling, combinations of these processes, as well as other processes well known in the art.

The paired piston arrangement, as shown in FIGURE 1, is provided to control the yaw attitude of the transducer supports. In other words, two pistons prevent rotation about an axis orthogonal to the disc surface and prevent translational movement parallel to the disc surface. If only one piston were used with a single transducer support, other means such as mechanical stops or the like would have to be provided to constrain the support with respect to the degrees of freedom indicated. If yaw motion were not constrained, the transducers could become misaligned with respect to the recording track or the recording surface.

In operation, disc 6 and other discs which rotate in synchronism with it, are caused to rotate. After operating speed is reached, a gas, such as air, is admitted under pressure into the cylinders for developing gas bearings with the various pistons. The gas pressure forces the pistons out of the cylinder until equilibrium develops between the gas bearing developed underneath the transducer supports and the force exerted on the transducer support by the pistons. If the spring arrangement shown in FIGURE 2 is utilized, the gas force must initially overcome the force of the spring before an equilibrium between the transducer support bearing and the piston force is achieved.

During operation, if the surface of the disc deviates, such as, for example, by having a depression, the force underneath that portion of the transducer support would be reduced and the substantially constant force provided by the piston above the reduced pressure area would force the support in the direction of the disc surface until equilibrium was again achieved. Similarly, if the surface deviated upward from an ideal planar surface, the force underneth the support would increase and force the piston toward the cylinder. In either case the transducer support is automatically self-aligned and centered by the integral restrictor bearing action due to the piston configuration and no frictional force is encountered during the alignment.

If the front portion of the support attempts to rotate into the surface of the disc, when there is no deviation, the pressure between the front support pad and the recording surface will increase and force the transducer to maintain a parallel position with respect to the disc, pivoting on the integral restrictor bearings. If the supports were subjected to a twisting motion, forces of the paired integral restrictor bearings would oppose the twisting motion and prevent the transducers connected to the supports from becoming misaligned with respect to the recording track of the recording surface. The same action occurs to counteract forces which subject the support to a translational movement with respect to the disc surface. The paired piston arrangement forces the support to maintain a relatively constant position with respect to the disc surface.

Although the invention has been described and illustrated in detail, it is to be understood that the same is by way of illustration and example only, and is not to be taken by way of limitation; the spirit and scope of this invention being limited only by the terms of the appended claims.

We claim:

1. Fluid bearing means for locating a support member relative to a positioning arm member and permitting self-alignment of the support with respect to a reference surface comprising,
   cylinder means connected to one of said members,
   piston means connected to the other of said members,
   said piston having a portion which inserts into said cylinder means, the surface of said piston and the adjacent cylinder wall form ing a fluid bearing,
   said piston having a circular cross-section and a longitudinal cross-section of the piston surface having a radius of curvature less than infinite and greater than the cross-sectional radius of said piston,
   means connected between said support and said arm for restricting rotational movement of said support with respect to an axis orthogonal to the reference surface, said arm member including means for directing a fluid to said bearing whereby the piston is forced outward from said cylinder and said fluid bearing is energized.

2. The combination as recited in claim 1, wherein said support means comprises a hydrodynamic bearing configuration for preventing frictional contact with said reference surface.

References Cited

UNITED STATES PATENTS

| | | | |
|---|---|---|---|
| 2,048,264 | 7/1936 | Harris | 92—75 |
| 3,193,810 | 7/1965 | Sampson | 340—174.1 |

BERNARD KONICK, Primary Examiner

WILLIAM F. WHITE, Assistant Examiner

U.S. Cl. X.R.

92—75, 132, 172